United States Patent [19]
Uno et al.

[11] 3,882,523
[45] May 6, 1975

[54] SHOCK-REDUCING STRUCTURE FOR SINGLE LENS REFLEX CAMERAS

[75] Inventors: Naoyuki Uno; Katsuhiko Nomura, both of Kawagoe, Japan

[73] Assignee: Asahi Kogaku Kogyo Kabushiki Kaisha

[22] Filed: Sept. 18, 1973

[21] Appl. No.: 398,433

[30] Foreign Application Priority Data
Sept. 20, 1972 Japan............................. 47-108438

[52] U.S. Cl. .............................. 354/156; 354/152
[51] Int. Cl. .......................................... G03b 19/12
[58] Field of Search .......... 354/153, 154, 152, 156; 95/42

[56] References Cited
UNITED STATES PATENTS
2,576,494  11/1951  Waggin............................. 354/156
3,319,551  5/1967   Ettischer et al..................... 354/154
3,474,715  10/1969  Nakamura........................... 354/153

Primary Examiner—Samuel S. Matthews
Assistant Examiner—E. M. O'Connor
Attorney, Agent, or Firm—Steinberg & Blake

[57] ABSTRACT

A single lens reflex camera having a swingable mirror capable of being held in its upper position. In order to reduce shock, the drive which normally operates to drive the mirror to its upper position is locked against operation when the mirror is held in its upper position. An automatic mirror raising lever includes a portion which is also actuated when the mirror is manually moved.

7 Claims, 4 Drawing Figures

SHOCK-REDUCING STRUCTURE FOR SINGLE LENS REFLEX CAMERAS

BACKGROUND OF THE INVENTION

The present invention relates to cameras.

In particular, the present invention relates to single lens reflex cameras.

As is well known, in cameras of this latter type there is a swingable mirror which normally occupies a lower viewing position extending downwardly and forwardly across the optical axis so as to reflect an image of the object which is to be photographed up to the viewfinder. When an exposure is made this mirror is conventionally swung up to its exposure position so that the light can travel from the objective below the mirror to the film in order to expose the latter when the shutter opens.

With cameras of this type it is possible to retain the mirror in its upper exposure position through suitable manually operable structure. This is done when certain lenses are used with the camera, for example. With conventional cameras of this latter type, when the mirror is thus held in its upper position, the drive which normally swings the mirror up just prior to exposure operates in precisely the same way when the mirror is held up by the manually operable structure with the result that the same shock and vibrations are provided as when the mirror is driven upwardly automatically just prior to exposure. However, when the mirror is held up by operation of the above manually operable structure there is no necessity for operation of the structure which normally drives the mirror up automatically. Thus, the same shocks, vibrations, and noise are made whether the mirror is held up or not with conventional cameras. However, these latter conditions are not present in cameras other than single lens reflex cameras where the tripping of the shutter is accompanied by a click which makes very little noise and where there is no shock.

Thus, with conventional single lens reflex cameras of the above type there is an unavoidable creation of shock, vibrations, and noise at a time when these conditions are not essential since the mirror driving structure does not carry out any useful function when the mirror is held in its upper exposure position.

SUMMARY OF THE INVENTION

It is accordingly a primary object of the present invention to provide a structure which will avoid the above drawbacks.

Thus, it is an object of the present invention to provide for a single lens reflex camera a structure which will reduce the shock, noise, and vibrations normally encountered with conventional cameras of the above type when the mirror is held up.

Specifically, it is an object of the present invention to provide a camera of the above type with a structure which is capable of locking the mirror driving structure against operation when the mirror is held in its upper position.

Furthermore, it is an object of the present invention to provide such a locking capability while adding to the conventional camera structure only a relatively small number of parts which can readily be accommodated in the available space and which operate very reliably to achieve the desired results.

In addition it is an object of the present invention to utilize for the purpose of preventing operation of the mirror driving structure when the mirror is held up many components of the camera which are in any event present in the camera and which operate during normal camera operation when the mirror is not held up.

According to the invention the camera has a swingable mirror which can be moved from a lower viewing position to an upper exposure position. An automatic mirror-raising means and a manually operable mirror-raising means are provided for raising the mirror automatically from its lower to its upper position and for raising the mirror manually from its lower to its upper position. An automatic drive means is provided to cooperate with the automatic mirror-raising means for driving the latter to raise the mirror from its lower to its upper position. A locking means is displaceable between a locking position locking the drive means against operation and a release position releasing the drive means for operation, and this locking means cooperates at least with the manually operable mirror-raising means to be displaced from its release to its locking position when the manually operable mirror-raising means is operated to place the mirror in its upper position.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
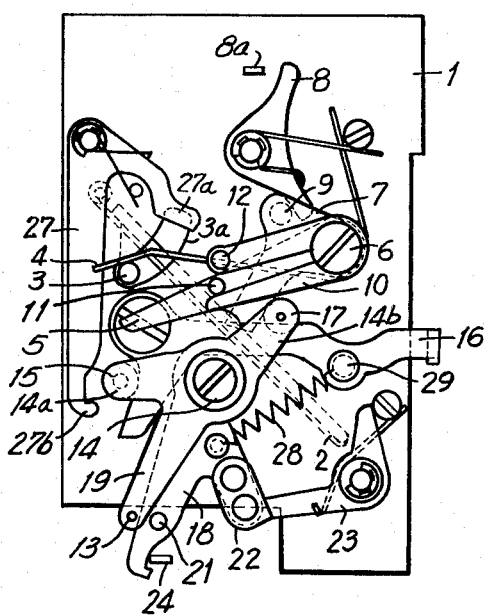
FIG. 1 shows in elevation the structure located at the side of a mirror box, this structure including the structure of the invention and being shown in FIG. 1 in the position which the parts taken when the mirror is in its lower viewing position.
Figure 2:
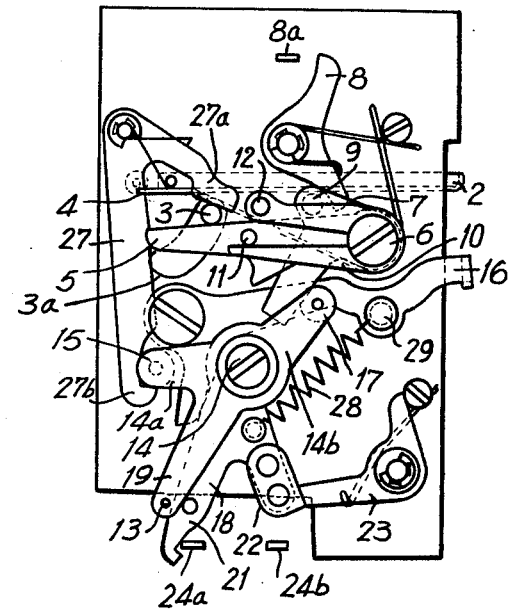
FIG. 2 shows the position of the parts of FIG. 1 when the mirror has been manually raised to its upper exposure position prior to manual operation of the shutter-releasing structure which results in tripping of the shutter.
Figure 3:
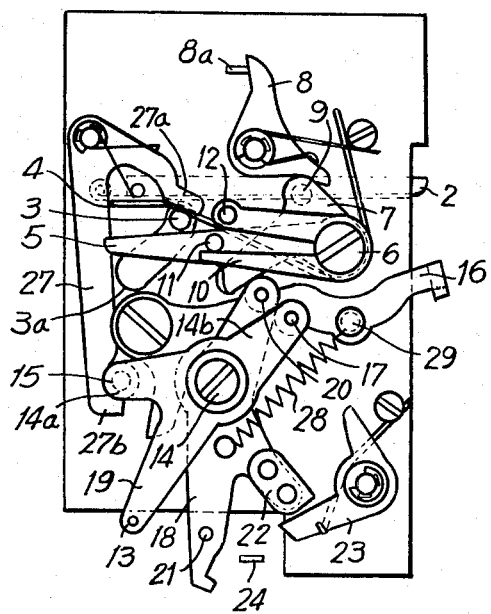
FIG. 3 shows the position which the parts of FIG. 2 take after the shutter release structure has been operated to trip the shutter.

Referring to the drawings, there is shown in FIGS. 1–3 the exterior surface of a wall of a mirror box 1 in which a mirror 2 is supported for swinging movement. As is well known this box 1 is open at its front portion, situated at the right in FIGS. 1–3, so that light can travel through the objective into the mirror box 1. The mirror 2 is supported for swinging movement around a horizontal axis situated at its upper end so that the mirror 2 can swing from the lower inclined viewing position thereof shown in FIG. 1 to the upper more or less horizontal exposure position thereof shown in FIG. 2. Thus, when the mirror is in the lower viewing position of FIG. 1 the light which travels through the objective will be reflected upwardly by the mirror to the viewfinder while when the mirror is in the upper exposure position of FIG. 2 the light will continue to travel along the optical axis beneath the mirror so as to expose film when the shutter opens, as is well known.

The wall of the box 1 which is visible in the drawings is formed with a curved slot 3a through which a pin 3 extends, this pin 3 being fixed to the mirror 2 so that when the pin 3 swings upwardly along the slot 3a the mirror will be raised, as is apparent from a comparison of FIGS. 1 and 2. A spring 4 is suitably mounted on the box 1 and presses downwardly on the pin 3 so as to urge the mirror to its lower position shown in FIG. 1.

An automatic mirror-raising means is provided for raising the mirror from the lower position of FIG. 1 to the upper position of FIG. 2, and this automatic mirror-raising means includes a lever 5 which is swingable about a pin 6 fixedly carried by the box 1. Thus when the lever 5 swings upwardly in a clockwise direction from the position of FIG. 1 to the position of FIG. 2 a part of the lever 5 formed by an upper surface region thereof engages the part which is formed by the pin 3 so as to displace the mirror from the position of FIG. 1 to the position of FIG. 2.

The shutter is tripped by displacement of an element 8a shown schematically in the drawings. This element 8a is displaced when engaged by a motion-transmitting means which includes a swingable lever 8 the upper end of which engages element 8a as shown in FIG. 3. Normally this swingable lever 8 is held by a suitable spring in the position of FIGS. 1 and 2. This motion-transmitting means further includes a lever 7 which is turnable on the pin 6 and carries a pin 9 which engages the lever 8 so as to turn the latter to the shutter-tripping position of FIG. 3 when the lever 7 is swung in a clockwise direction from the position of FIG. 2 into the position of FIG. 3.

The illustrated structure further includes a manually mirror-raising means. This manually operable mirror-raising means is in the form of a U-shaped lever swingably mounted on the pin 6 and situated in part beside the lever 5 so that the lever 5 of the automatic mirror raising means and the lever 10 of the manually operable mirror raising means have a common turning axis. The lever 5 carries a pin 11 which is engaged by part of the lever 10, the latter being urged by a suitable spring into engagement with the pin 11, and the lever 10 in addition carries a pin 12 which is connected to an unillustrated manually operable structure which is capable of being actuated by the operator in order to swing the lever 10 in a clockwise direction from the position of FIG. 1 into the position of FIG. 2 in order to raise the mirror.

Thus, it will be seen that the automatic mirror-raising means formed by the lever 5 and the manually operable mirror-raising means formed in part by the lever 10 have a common portion, this common portion being the left free end region of the lever 5 which engages the pin 3. Thus, when the manually operable lever 10 is turned in a clockwise direction from the position of FIG. 1 the turning thereof is transmitted through the pin 11 to the lever 5 so as to turn the latter in order to engage the pin 3 and raise the mirror. However when the lever 5 is automatically driven, in a manner described below, it will also turn so that the same portion thereof which engages the pin 3 when the lever 10 is manually turned also engages the pin 3 during automatic driving of the lever 5 in order to raise the mirror. In other words, the automatic mirror raising means is operable independently of the manually operable mirror raising means. However, the manually operable mirror raising means transmits motion to the mirror, in order to raise the latter, only by acting through the automatic mirror raising means on the mirror. Therefore, the automatic mirror raising means has a portion which forms part of the manually operable mirror raising means, and it is this latter part of the automatic mirror raising means which also forms part of the manually operable mirror raising means which is the portion common to both of the mirror raising means.

Figure 4:
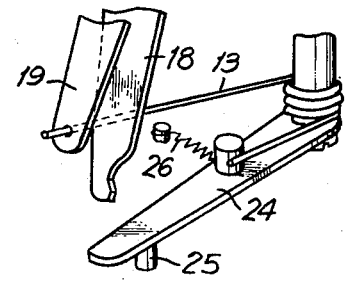
FIG. 4 is a fragmentary perspective illustration of structure at the lower end of FIGS. 1–3.

The drive means for driving the lever 5 in order to raise the mirror automatically is formed by a lever 19 which is supported for turning movement on a pin 14 carried by the box 1. This lever 19 has a downwardly extending arm, the lower end of which is illustrated in FIG. 4. Thus, a spring 13 is operatively connected with the drive means 19 to form a spring means which normally tends to urge the drive means 19 to turn in a counterclockwise direction as viewed in FIGS. 1–3.

The lever 19 has an upper rearwardly extending arm 14a which carries a projecting portion formed by a roller 15. This projecting portion 15 normally operates to turn a diaphragm-control lever means 16 referred to below. The lever 19 has a further arm 14b extending upwardly toward the right in FIGS. 1–3, and this arm 14b carries a roller 17 situated in the same plane as the lever 5 so that when the drive means 19 normally swings in a counterclockwise direction the projection 17 thereof engages the lever 5 to drive the latter upwardly in order to move the mirror from its lower to its upper position.

The pin 14 swingably carries between the lever 19 and the wall of the box 1 which is visible in the drawings an additional lever 18 which forms part of the motion-transmitting means for displacing the shutter-tripping means 8a. This lever 18 thus has a turning axis in common with the lever 19. The lever 18 has an upper arm identical with the arm 14b, and this arm carries a roller 20 situated in the same plane as the lever 7 of the motion-transmitting means. Thus, when the lever 18 swings in a counterclockwise direction about the pin 14, as viewed in FIGS. 1–3, the roller 20 will swing the lever 7 in a clockwise direction and the lever 7 will swing the lever 8 in a counterclockwise direction so that through the motion-transmitting means formed by the levers 18, 7, and 8, the shutter-tripping means 8a will be moved to trip the shutter.

The diaphragm-control lever means 16 is in the form of an elongated substantially L-shaped lever having a donwardly extending arm situated in the path of turning movement of the projection or roller 15 and having a substantially horizontally extending arm which terminates at its front end in a projection which controls the diaphragm in a known way. This lever 16 is supported for swinging movement at its upper left end region, as viewed in the drawings, on a suitable pin carried by the wall of the box 1 which is visible in the drawings. A spring means 28 is connected at one end to the lever 18 and at another end to a pin 29 which is carried by the lever 16. Through this spring means 28 the lever 16 will normally be held in the position shown in FIG. 1 where the diaphragm is in its fully open position permitting the object to be clearly viewed in the viewfinder, as is well known. The stopping down of the diaphragm to the preselected aperture size which is used during exposure of the film is brought about by swinging of the lever 16 from the position of FIG. 1 in a counterclockwise direction, and it will be noted that the lever 16 is shown angularly displaced in a counterclockwise direction in FIGS. 2 and 3 from the position shown in FIG. 1. Thus, the spring 28 normally operates to hold the lever 16 in the position of FIG. 1, but during the normal operations in connection with exposure of the film the drive means 19 will, in addition to driving the lever 5, swing the lever 16 so as to enable the diaphragm to be stopped down automatically to its preselected aperture in a well known manner.

The lever 18 has a portion normally engaged by the lever 19 so that the drive means 19 as well as the spring 28 normally serve to drive the lever 18 of the motion-transmitting means. This portion of the lever 18 which is engaged by the lever 19 is formed by the pin 21 which is fixed to the lever 18 and situated in the path of counterclockwise turning of the lever 19, as viewed in FIGS. 1–3.

The lever 18 also carries an arm directed downwardly toward the right, and this arm fixedly carries a lock plate 22 which cooperates with a manually operable shutter release means 23. The manually operable shutter release means 23 is in the form of a swingable bell crank pivotally mounted on a suitable pin which is carried by the box 1 as illustrated at the lower right part thereof in the drawings, and a suitable spring normally urges the shutter-release means 23 to turn in a clockwise direction into engagement with the stop member formed by the screw which engages the upper end of the spring which is hooked around the lower edge of the lever 23 in the manner illustrated. This lever 23 is capable of being manually operated when the shutter-plunger is pressed by the operator. Normally the lever 23 assumes the position shown in FIGS. 1 and 2. However, in a well known manner, when the operator depresses the shutter plunger through a suitable transmission the lever 23 will be turned from the position shown in FIGS. 1 and 2 into the position shown in FIG. 3. This manually operable release means 23 has a holding position shown in FIGS. 1 and 2 where the manually operable release means 23 engages the plate 22 so as to hold the parts in the position shown in FIGS. 1 and 2. However, when the manually operable shutter-release means 23 is displaced by manipulations of the operator to the position shown in FIG. 3, the shutter release means 23 assumes its release position where it is displaced beyond the plate 22 so that now the lever 18 of the motion-transmitting means is released to the force of the spring 28 as well as the force of the spring 13 which acts through the drive means 19 normally on the lever 18 by way of the pin 21 thereof as described above.

A control lever 24 is swingably mounted beneath the box 1 in the manner illustrated in FIG. 4. This control lever 24 is operatively connected by way of a pin 25 to the transmission which is moved by the operator when the shutter-cocking and film-transporting lever on the camera is turned in order to cock the shutter and displace the film frame to the exposure position. Thus, whenever the shutter is cocked and the film is transported the lever 24 is turned from the left position 24a shown in FIG. 2 to the right position 24b shown in FIG. 2. After the shutter has been tripped in order to make an exposure, a spring 26 shown in FIG. 4 is free to return the lever 24 to the position 24a shown in FIG. 2, and this movement of the lever 24 swings the lever 18 from the position of FIG. 3 back to the position of FIGS. 1 and 2, the pin 21 now acting on the lever 19 to return the latter also to the position of FIGS. 1 and, and in this way, the motion-transmitting means assumes its rest position ready to move the shutter-tripping means 8a at the next exposure. It will be noted that as soon as the plate 22 has been turned back to the position of FIGS. 1 and 2, the shutter-release means 23 will again resume its holding position shown in FIGS. 1 and 2 preventing the lever 18 from returning to the position of FIG. 3. Then when the shutter-cocking and film-transporting lever is manipulated as referred to above, the lever 24 is displaced from the position 24a into the position 24b so that the spring 13 has stored therein a force which will be capable of driving the drive means formed by the lever 19 in order to bring about the above operations of actuating the automatic mirror-raising means 5 as well as controlling the diaphragm and contributing to the drive of the motion-transmitting means which trips the shutter. In a known way, when the shutter is cocked the lever 24 is held in the position 24b so that spring 13 retains the force stored therein until the shutter has been tripped at which time the lever 24 is released so that the spring 26 can act to turn the lever 24 back to the position 24a so that the manually operable shutter-release means 23 can again assume its holding position for holding the parts in the position of FIGS. 1 and 2.

As is apparent from the above description, when the manually operable mirror-raising means 10 has been operated to raise and hold the mirror in its upper position as shown in FIG. 2, the operation of the drive means 19 is without any particular significance since the diaphragm will be manually stopped down with a suitable structure acting at this time on the pin 29 to raise the latter and swing the lever 16 from its position shown in FIG. 1 in a counterclockwise direction, and at the same time the force of the spring means 28 is adequate to operate the motion-transmitting means 18, 7, 8 in order to displace the shutter-tripping means 8a. Thus if the drive means 19 operates when the parts are in the position of FIG. 2, it will only create needless shock, noise, and vibration. Therefore, in accordance with the present invention a locking means 27 is provided to lock the drive means 19 against operation, in opposition to the force of the spring 13, when the manually operable mirror-raising means 10 has been operated to hold the mirror 2 in its upper exposure position.

This locking means 27 is swingably supported at its upper left end region on a suitable pin carried by the wall of the box 1 which is visible in the drawings, and a suitable spring acts on the lever 27 to urge it to the release position shown in FIG. 1. In this release position the upper downwardly and forwardly inclined arm of the lever 27 extends across the upper end region of the slot 3a, where the lock means 27 has a portion 27a situated in the path of movement of the part 3. Also at this time the left downwardly extending arm of the lock means 27 extends downwardly in a substantially vertical direction as illustrated in FIG. 1. This downwardly extending arm of the lock means 27 terminates in a lower end region 27b formed at its right edge, as viewed in the drawings, with a notch for receiving the projection of drive means 19 which is formed by the roller 15. Thus, whenever the pin 3 is raised to the position shown in FIGS. 2 and 3, it engages the portion 27a of the locking means 27 so as to displace the latter from the release position of FIG. 1 to the locking position of FIGS. 2 and 3, and if the lever 19 is still in the position shown in the drawings, then the end region 27b of the locking means 27 will engage the roller so as to prevent the lever 19 from being driven by the spring 13.

Thus, the parts are shown in FIG. 1 prior to cocking of the shutter in the position which the parts take after one exposure has been completed and the mirror 2 is in the position for directing an image of the object up to the viewfinder. When the shutter is cocked the element 24 will be shifted to the position 24b as shown in FIG. 2. However, if desired, it is possible for the operator to displace the manually operable lever means 10 to bring the mirror 2 into its upper position in which it is held as illustrated in FIG. 2, prior to exposure, this type of operation being provided when certain lenses are used on the camera, as is well known, and at the same time a suitable structure acts on the pin 29 to raise the lever 16 since at this time the diaphragm will in almost all cases be manually operated. Thus, the spring means 28 has been tensioned beyond the condition thereof shown in FIG. 1 so that an additional driving force is stored therein when the mirror is displaced to its upper position by the manually operable means 10. Moreover, it will be seen that the displacement of the mirror manually to its upper position has caused the lock means 27 to be displaced to its locking position so that the drive spring 13 cannot turn the drive means 19. Now when the shutter release means 23 is displaced by the operator from the position of FIG. 2 into the position of FIG. 3, the spring means 28 will swing the lever 18 to bring about through the motion-transmitting means 18, 7, 8 a tripping of the shutter by way of acting on the shutter-tripping means 8a. However, the lever 19 remains stationary in the position shown in FIG. 3. As a result there is no creation of undesirable shock, vibrations, and noise.

Whenever desired the operator can turn the mirror 2 into the lower viewing position thereof shown in FIG. 1, and at this time the parts will operate in a normal conventional manner. Thus if the parts are in the position of FIG. 1 and the shutter has been cocked so that element 24 is in position 24b of FIG. 2, and the operator now operates the shutter-release means 23 to move it downwardly away from the holding plate 22, the spring 13 is free to act on the drive means 19 so as to drive the latter together with the lever 18 which is driven in part at this time by the force in the spring 28, this force being less than that provided by the spring 28 when the lever 16 has the position of FIG. 2, as pointed out above. The result is that the diaphragm-control lever means 16 will now be operated by the drive means 19 which at the same time will contribute to the driving of the motion-transmitting means 18, 7, 8, but before the shutter is actually tripped by this motion-transmitting means the drive means 19 will have acted through its roller 17 on the lever 5 of the automatic mirror raising means to raise the mirror up to its exposure position so that when the shutter is tripped the mirror will not prevent the travel of light to the shutter. Because the portion 27a of the locking means 27 overlaps only the upper region of the slots 3a, the lever 27 is not swung into its locking position until the mirror 2 has almost reached its upper exposure position, so that during normal operation when the mirror is not held up in the position of FIG. 2 the roller 15 has already reached a portion beyond the lower end 27b to the lock means 27, and thus the lock means 27 at this time will have no influence on the operation although it will in fact swing to its locking position whenever the mirror 2 is swung up to its exposure position.

Although it is possible for a portion of the lever 5 to act directly on the part of the locking lever 27, instead of the pin 3, and although it is also possible to displace the lever 27 to its locking position independently by way of the lever 10 instead of turning the lever 5 together with the lever 10, the particular construction shown above is preferred because a multiplicity of functions are given in this way to the pin 3 enabling the lever 27 to be situated close to the surface of the box 1 which is visible in FIG. 3, so that a compact structure is achieved, and because with the above construction the left free end portion of the lever 5 forms a portion which is common to the automatic mirror-raising means and the manually operable mirror-raising means, enabling the lever 10 which forms the manually operable mirror raising means in this way also to occupy a smaller space and to be made of a smaller size.

In addition to these latter advantages achieved with the structure of the invention, it is to be noted that the basic advantage which is achieved is that when the mirror is held in the position of FIG. 2 the drive means 19 is not operated so that the shock, noise, and vibration which otherwise would result are completely eliminated with the structure of the invention. In addition, it will be seen that with the structure of the invention it is possible to very easily achieve the condition where the mirror is held in its upper exposure position with this latter operation utilizing the same lever 5 which is used during automatic driving of the mirror upwardly and with a construction which makes it extremely simple to act on the pin 12 from the exterior of the camera to bring about manual raising of the mirror.

What is claimed is:

1. In a single lens reflex camera, a swingable mirror having a lower viewing position and an upper exposure position, automatic raising means operatively connected with said mirror for automatically raising the latter from said lower viewing position to said upper exposure position thereof in response to initiation of a shutter-releasing operation, manually operable raising means operatively connected with said mirror for manually raising the latter from said lower viewing position to said upper exposure position thereof, drive means operatively connected with said automatic raising means for driving the latter to raise the mirror from said lower viewing position to said upper exposure position thereof, and lock means having a locking position engaging said drive means to prevent the latter from driving said automatic mirror raising means and a release position displaced from said drive means so that the latter is free to drive said automatic mirror raising means, said lock means normally occupying said release position thereof and cooperating at least with said manually operable mirror raising means to be displaced from said release to said locking position when said manually operable raising means raises the mirror to its exposure position, said automatic mirror raising means being operable independently of said manually operable mirror raising means while the latter operates said automatic mirror raising means for transmitting motion therethrough to said mirror so that a portion of said automatic mirror raising means forms part of and is in common with said manually operable mirror raising means, the latter portion of said automatic mirror raising means cooperating directly with the mirror for raising the latter from said lower viewing position to said upper exposure position when either of said mirror raising means operates, said automatic mirror raising means including a swingable driven lever having said portion cooperating directly with said mirror for raising the latter from said lower viewing position to said upper exposure position thereof, and said manually operable mirror raising means including a swingable lever operatively connected with said driven lever for manually swinging the latter to raise the mirror through said portion of said lever of said automatic raising means which cooperates directly with siad mirror.

2. The combination of claim 1 and wherein said portion of said lever of said automatic mirror raising means and said mirror respectively have motion-transmitting parts which engage each other during raising of the mirror from said lower viewing position to said upper exposure position thereof, and said lock means being displaced by one of the latter parts, during upward movement of the mirror, from said release to said locking position thereof, so that said lock means is displaced from said release to said locking position thereof irrespective of whether said manually operable or automatic raising means operates, shutter-tripping means for tripping a shutter of the camera to make an exposure, motion-transmitting means for transmitting motion to said shutter-tripping means to move the latter for tripping the camera shutter, said drive means cooperating with said motion-transmitting means for normally driving the latter to operate said shutter-tripping means just after said drive means drives said automatic raising means to raise the mirror from its lower viewing position to its upper exposure position, spring means operatively connected with said motion-transmitting means for driving the latter together with said drive means and independently thereof, and manually operable shutter release means capable of being displaced by the operator from a holding position, holding said motion-transmitting means in opposition to said spring means and drive means which tend to drive said motion-transmitting means, to a release position releasing said motion-transmitting means to be driven, so that if said manually operable mirror raising means has first been operated to raise the mirror said lock means engages said drive means prior to displacement of said shutter release means from said holding to said release position thereof to lock said drive means against operation while said motion-transmitting means is driven by said spring means alone to displace the shutter-tripping means.

3. The combination of claim 2 and wherein said motion-transmitting parts include an exterior surface region of said lever of said automatic raising means and a pin fixed to said mirror to be engaged by said exterior surface region of said lever of said automatic raising means.

4. The combination of claim 2 and wherein a diaphragm control lever means is swingable for controlling the diaphragm, said drive means normally turning said diaphragm control lever means as well as said automatic mirror raising means, and said spring means being connected between said motion-transmitting means and said diaphragm control lever means.

5. The combination of claim 4 and wherein said lever of said manually operable raising means and said lever of said automatic raising means have a common turning axis, and said lever of said automatic raising means having a pin engaged by a portion of said lever to said manually operable raising means so that when the latter is operated said lever thereof acts through said pin to turn said lever of said automatic raising means.

6. The combination of claim 5 and wherein an additional spring means is operatively connected with said drive means for driving the latter and said drive means normally being urged by said additional spring means into engagement with a portion of said motion transmitting means for contributing to the drive thereof in order to actuate said shutter-tripping means, said drive means having a projecting portion normally engaging said diaphragm control lever means for operating the latter, and said lock means cooperating with the latter projecting portion of said drive means to prevent the latter from being moved by said additional spring means.

7. The combination of claim 6 and wherein said parts of said lever of said automatic raising means and said mirror include a pin fixed to said mirror and an exterior surface region of said lever of said automatic raising means which engages said pin during raising of said mirror, said lock means having a portion situated in the path of movement of said pin to be moved thereby when the mirror is raised to its exposure position and the movement of said portion of said lock means by said pin displacing said lock means from said release to said locking position thereof.

* * * * *